Jan. 10, 1950 — M. M. WEINTROB ET AL — 2,494,022
COOKING OVEN
Filed Jan. 5, 1946 — 3 Sheets-Sheet 1

INVENTORS
Max M. Weintrob
BY Gene Gerety
Attorneys.

INVENTORS
Max M. Weintrob
BY Gene Gerety

Jan. 10, 1950     M. M. WEINTROB ET AL     2,494,022
COOKING OVEN
Filed Jan. 5, 1946     3 Sheets-Sheet 3
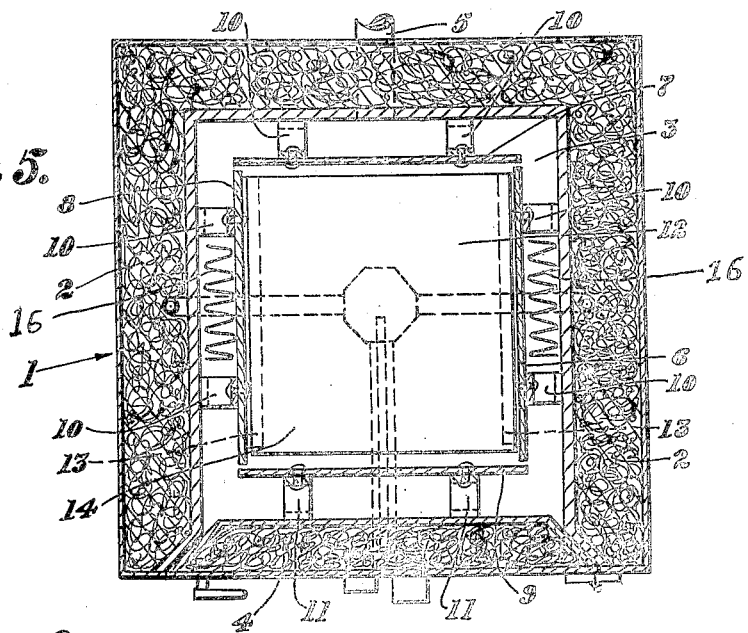
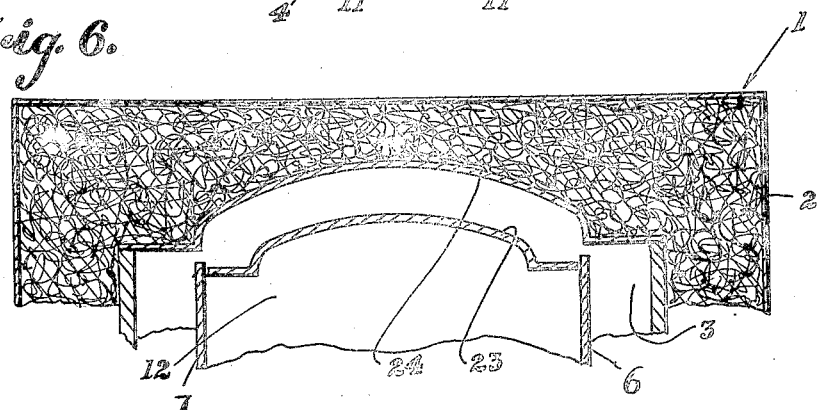
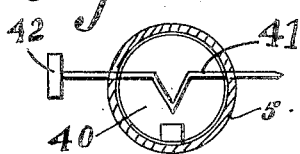
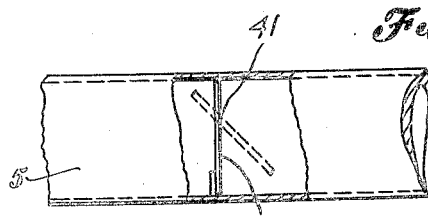
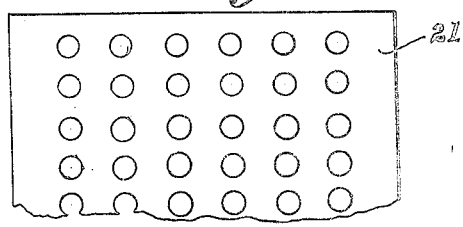
INVENTORS
Max M. Weintrob
BY Gene Gerety Patented Jan. 10, 1950

2,494,022

UNITED STATES PATENT OFFICE 2,494,022

COOKING OVEN

Max M. Weintrob and Gene Gerety, Medford, Mass.; said Weintrob assignor to said Gerety Application January 5, 1946, Serial No. 639,229

1 Claim. (Cl. 126—20)

This invention relates to cooking or baking ovens, and one object of the invention is to provide an oven in which the food is cooked at a high temperature but at substantially atmospheric pressure and without subjecting the food to any dehydrating effect during the cooking operation.

A further object of the invention is to provide a cooking oven in which the food is cooked at a high temperature and in an atmosphere of dry water vapor which is at normal atmospheric pressure.

As a result of cooking food in this way, all the natural juices and the pristine flavor of the food are retained during the cooking operation, so that when the cooked food is taken from the oven, it has lost none of its nutritive value. Vegetables which are cooked in this improved oven experience no shrinkage during the cooking operation, but will come out of the oven in their natural plump, full-bodied condition. Meats which are cooked in this improved oven will not shrink during the cooking operation nor will there be any loss of the meat juices. On the other hand, all the juices of the meat will be retained and the meat will be swelled rather than shrunk during the cooking or baking operation.

In order to give an understanding of the invention, we have illustrated herein a selected embodiment thereof which will now be described after which the novel features will be pointed out in the appended claim.

In the drawings:

Fig. 5 is a section on the line 5—5, Fig. 2.

Fig. 6 is a fragmentary section on the line 6—6, Fig. 1.

Fig. 7 is a fragmentary view showing the portion of the outlet pipe which has the damper thereon.

Fig. 8 is a transverse section through Fig. 7.

Fig. 9 illustrates a portion of the vapor plate.

Figure 1:
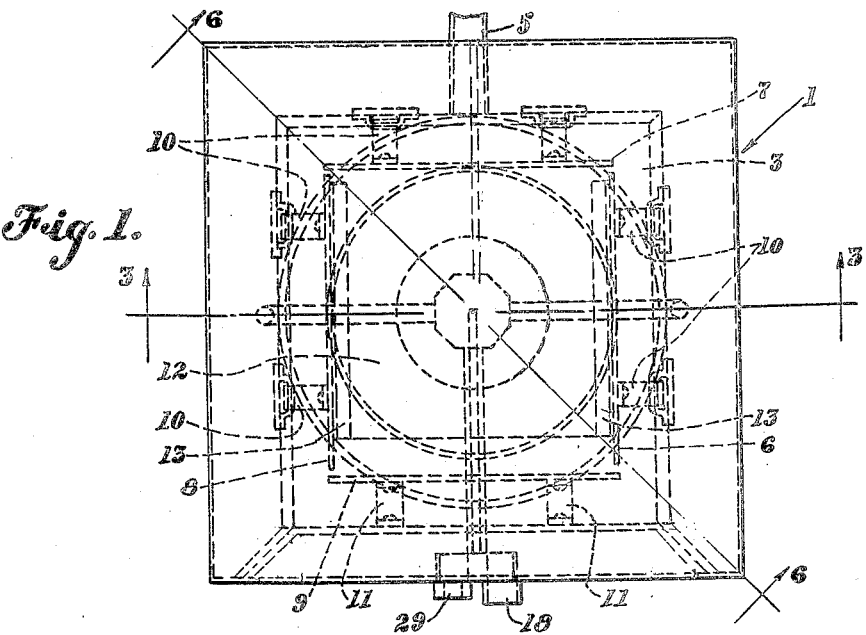
Fig. 1 is a top plan view of an oven embodying my invention.
Figure 2:
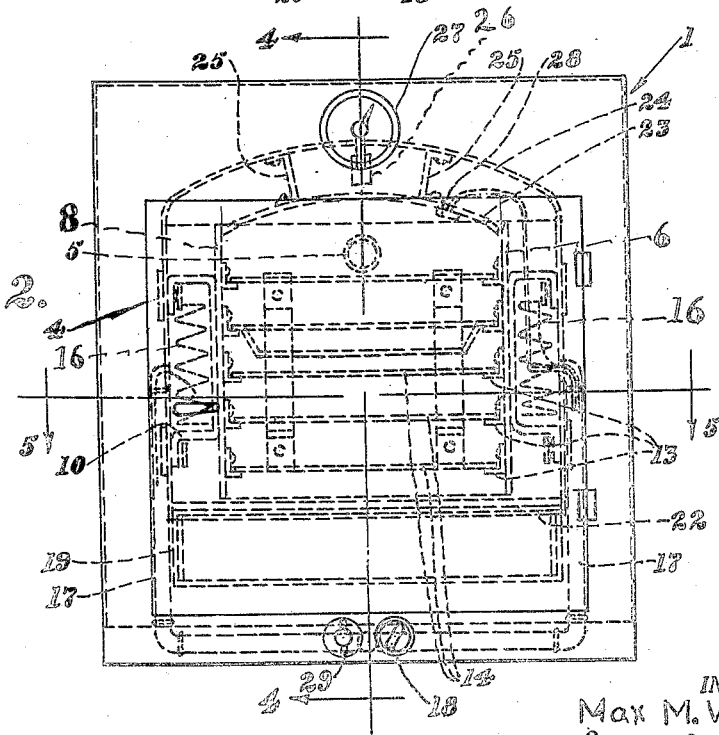
Fig. 2 is a front view thereof.
Figure 3:
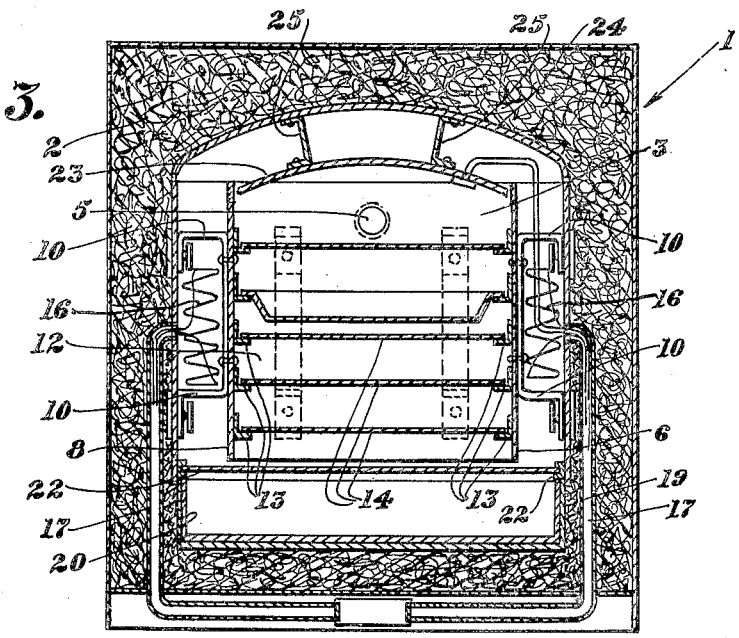
Fig. 3 is a section on the line 3—3, Fig. 1.
Figure 4:
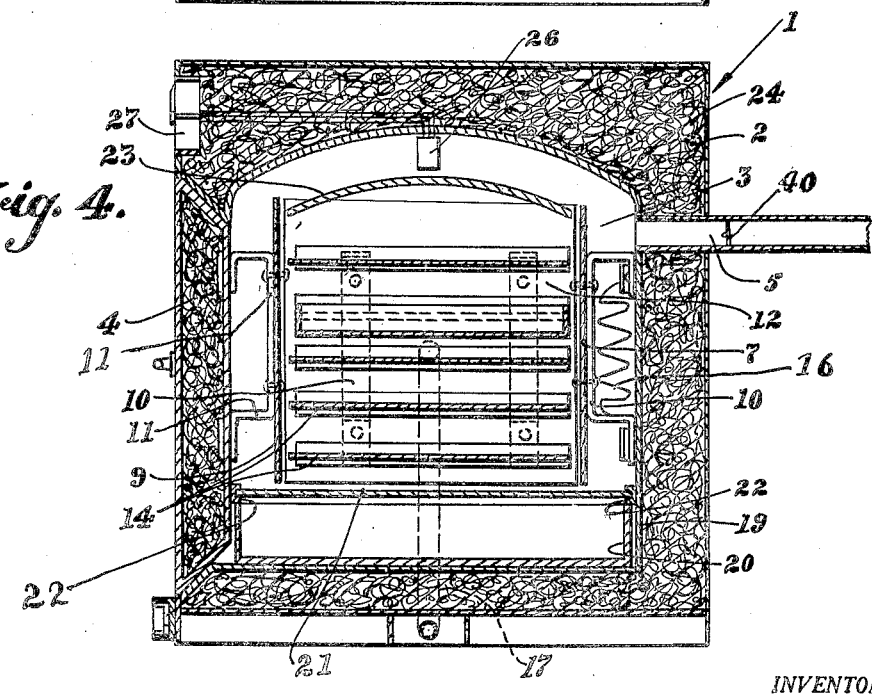
Fig. 4 is a section on the line 4—4, Fig. 2.

In the drawings 1 indicates an oven embodying the present invention, said oven being provided with the insulating walls 2 which enclose an oven chamber 3 in which the food is cooked. The oven 1 is shown as provided with a door 4 to provide access to the oven chamber 3.

The oven chamber 3 has communication with the outside atmosphere through the pipe or conduit 5 so that atmospheric pressure conditions will exist within the chamber 3.

Situated within the oven chamber 3 are a plurality of vertical baffle plates 6, 7, 8 and 9 which preferably extend parallel to the vertical walls of said oven chamber but are spaced therefrom. The baffle plates 6 and 8 are parallel to the walls at the opposite sides of the chamber, the baffle plate 7 extends parallel to the back wall of said chamber, while the baffle plate 9 lies parallel to the front wall of the chamber.

These baffle plates may be secured in place by any suitable means, but as herein shown, each baffle plate is secured to supporting brackets 10 which in turn are secured to the walls of the oven chamber 3. With respect to the baffle plate 9, this is shown as carried by supporting brackets 11 secured to the inside of the door 4. These baffle plates 6, 7, 8 and 9 enclose an inner cooking compartment 12 in which the food is placed to be cooked or baked. The baffle plates 6 and 8 are shown as provided with ledges 13 adapted to support shelves 14 on which the food to be cooked may be placed.

Suitable heating means is located between the baffle plates 6 and 8 and the side walls of the oven chamber, such heating means conveniently being in the form of electric heating units 16. The circuit wires leading to such heating units are shown as being contained in conduits 17 located in the insulating walls of the oven 1, said conduits leading to a suitable switch 18 which may be conveniently located in the front of the oven beneath the door.

If desired, additional heating units 16 may be located between the back baffle plate 7 and the back wall of the oven chamber.

These heating units will be of sufficient capacity to heat the oven chamber to a high temperature on the order of approximately 500° F. although the temperature may be varied somewhat from this figure without departing in any way from the invention.

The oven chamber 3 extends below the baffle plates 6, 7, 8, 9 and below the cooking compartment 12 as indicated at 19. Situated in the bottom portion 19 of the oven chamber is a well 20 adapted to contain water, and located between the well 20 and the cooking compartment 12 is a perforated vapor plate 21, the latter being shown as supported in channel iron supports 22 that are secured to the side walls of the oven chamber.

23 indicates a crown sheet element which is located at the upper end of the baffle plates 6, 7, 8, 9 and which forms the roof of the cooking compartment 12. The central portion of this crown sheet has a dome shape, and it is spaced from the dome-shaped roof 24 of the oven compartment. The crown sheet may be held in place in any suitable way, but for this purpose there is herein shown supporting brackets 25 which are secured to and depend from the roof 24 of the oven compartment and to which the crown sheet 23 is secured. 26 indicates a thermometer which is located in the space between the crown sheet 23 and the roof of the oven compartment, said thermometer being of the known type which is adapted to indicate the temperature on a dial or other indicator 27 situated remote from the thermometer, such dial or indicator being illustrated as mounted on the front of the oven.

28 indicates a thermostat element located in the oven by which the temperature of the oven may be controlled, said thermostat operating in the usual way to regulate the current delivered to the heating units in accordance with any variations of temperature in the oven. The thermostat may have the usual manual control 29 by which it can be set for different temperatures.

It will be noted that the insulation 2 extends around the sides and across the bottom of the well 20 so that said well is insulated on all sides except at the top.

When the oven is in operation, the high temperature (on the order of 500° F.) within the oven compartment causes a surface evaporation of the water in the well 20 in sufficient quantities so that the atmosphere within the oven chamber contains a sufficient amount of highly heated water vapor to offset any dehydrating tendency in the food while it is being cooked, and as a result, the food is not subjected to any dehydrating effect during the cooking operation as stated above.

Since the chamber 3 has communication with the atmosphere through the pipe 5, the pressure within the chamber 3 will remain at substantially atmospheric pressure and with this device therefore the cooking is done at atmospheric pressure in a highly heated atmosphere containing a sufficient amount of highly heated water vapor to prevent any appreciable dehydrating effect on the food while it is being cooked.

The perforated plate 21 acts as a baffle plate to trap anything in the nature of a wet steam as the evaporation occurs so that the water vapor which is delivered through the perforations in the plate is a highly heated dry water vapor.

Food which is cooked under these conditions retains all of its natural juices and its pristine flavor, and as a result none of the nutritive value of the food is lost by the cooking operation. Furthermore, since all the natural juices of the food are retained therein while it is being cooked, the food will experience no shrinkage but will retain its original size and shape.

Because of the high temperature, vegetables and meats may be cooked in a relatively short period of time. The atmosphere containing dry water vapor in which the food is cooked prevents it from becoming dehydrated or burned by the high temperature notwithstanding the high temperature under which the cooking is done.

We will preferably employ a butterfly damper 40 in in the pipe 5, said damper being pivotally mounted on the horizontal pin 41 which is located slightly above the center of the damper so that normally the damper will remain in closed position by gravity. If, however, during cooking operations the pressure in the oven chamber begins to rise above atmospheric pressure, the damper will be automatically opened to relieve the pressure. The pin 41 on which the damper is mounted is provided with a handle 42 by which the damper can be manually operated.

We claim:

A cooking oven comprising an insulated oven chamber communicating with the atmosphere, vertical baffle plates within said chamber and spaced from the side walls thereof, said baffle plates enclosing a cooking compartment in which the food is cooked and the adjacent baffle plates having their vertical edges spaced from each other, heating means situated between the baffle plates and the walls of the oven chamber for heating said chamber to a relatively high temperature, a crown sheet forming the roof of the cooking compartment, said crown sheet being spaced from the roof of said chamber and having its edges spaced from the baffle plates, an open well containing water located in the oven chamber below said cooking compartment and also below and spaced from the heating means, whereby the evaporation of the water in the well will be a surface evaporation a perforated vapor plate between said cooking compartment and said well, and means insulating the sides and bottom of said well.

MAX M. WEINTROB.
GENE GERETY.

REFERENCES CITED

The following references are of record in the file of this patent:

UNITED STATES PATENTS

| Number | Name | Date |
|---|---|---|
| 1,001,637 | Gray | Aug. 29, 1911 |
| 1,051,503 | Klein | Jan. 28, 1913 |
| 1,069,441 | Lawrence | Aug. 5, 1913 |
| 1,168,857 | Coes | Jan. 18, 1916 |
| 1,371,057 | Russell | Mar. 8, 1921 |
| 1,400,221 | Kaufer | Dec. 13, 1921 |
| 1,421,425 | Duncan | July 4, 1922 |
| 1,544,976 | Grant | July 7, 1925 |
| 1,986,088 | Wild | Jan. 1, 1935 |

FOREIGN PATENTS

| Number | Country | Date |
|---|---|---|
| 561,429 | France | Oct. 22, 1923 |